3,210,105
BALL JOINTS
Jakob Vogt, Dusseldorf-Oberkassel, Germany, assignor to A. Ehrenreich & Cie.
Filed July 10, 1961, Ser. No. 122,926
Claims priority, application Germany, July 13, 1960, E 19,597
1 Claim. (Cl. 287—87)

This invention relates to ball and socket joints of the kind in which the ball is held in a resilient lining within the socket and the lining, which extends on both sides of the equator or center line of the ball is split on one side of the center line axially of the ball stud to form resilient tongues. The resilient tongues are pressed into contact with the ball so that the ball is seated securely in the unslit part of the lining.

According to the present invention, each of the resilient tongues, of a joint of the kind described has an extension extending in the direction of the longitudinal axis of the ball and the tongues are pressed into contact with the ball by retaining means surrounding the extensions.

The retaining means is preferably a resilient device, such as a spring ring, which may be located in a peripheral groove formed in the surfaces of the extensions remote from the ball.

With this arangement, the tongues are more evenly pressed against the ball than when the retaining means engages the part of the tongues in contact with the ball.

Two examples of a joint constructed in accordance with the present invention are illustrated in the accompanying drawings in which.

Figure 1:
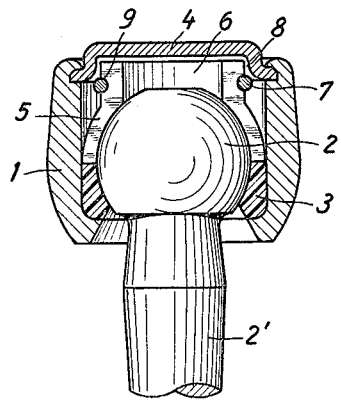
FIGURE 1 shows one ball and socket joint in vertical section.
Figure 2:
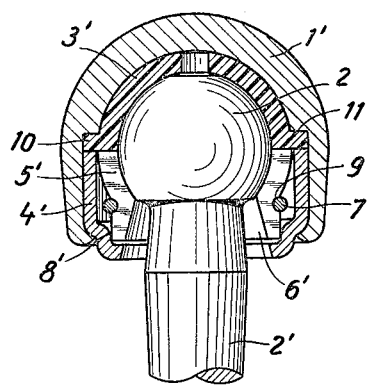
FIGURE 2 is a vertical section of the other ball and socket joint.

In both examples the joint comprises a joint pin 2' with a ball 2 and a socket 1 as in FIG. 1 and 1' as in FIG. 2. A lining 3 as in FIG. 1 and 3' as in FIG. 2, of resilient plastic material, is provided in the socket and the ball is mounted in the lining.

In the example shown in FIGURE 1 the unslit part of the lining is arranged at the end of the socket at which the joint pin 2' emerges from the socket 1, while in the example shown in FIGURE 2 it is situated on the other side of the socket. The lining bears snugly against the ball and embraces the ball on both sides of its center line.

On one side the lining has an extension 6 as in FIG. 1 and 6' as in FIG. 2 projecting parallel to the longitudinal axis of the ball. On this side of the center line the lining and its extension are provided with axially extending slits designated by numeral 5 in FIG. 1 and by numeral 5' in FIG. 2 so that resilient tongues are formed.

A peripheral groove 9 is provided in the outer peripheral surface of the extensions 6 and 6' and retains a spring ring 7 which presses the tongues formed by the slits against the ball. In the example shown in FIGURE 2, the peripheral groove is formed at the junction of the extension 6' with the lining 3'.

The end of the extensions 6 and 6' engages annular surfaces 8 and 8' respectively. In the example shown in FIGURE 1, this annular surface is formed by a depression in a cover 4 of the socket. A gap is between the annular surface 8 and the extension 6.

In the example shown in FIGURE 2, the annular surface 8' is formed by an annular insert 4' which is inserted in the socket 1' and is shaped to form the annular surface. The insert is secured by a lip of the socket. The annular surface bears against the extension 6' so that the joint is usable even if there is no spring ring.

In FIGURE 2 the lining 3' has a peripheral flange 10 which bears against an inner annular shoulder 11 of the socket and is fixed on this shoulder by the insert 4' so that the lining is secured against turning or tilting.

We claim:

A ball and socket joint comprising a ball stud, a socket for receiving the ball member of said ball stud, a resilient lining disposed between said ball member and the inner wall of said socket, said lining enclosing said ball member on both sides of its center line perpendicular to the longitudinal axis of said ball stud, said lining having slits on one side of said center line forming a plurality of separate resilient tongues, extensions on said tongues at said one side projecting in the direction of the longitudinal axis of said ball stud beyond said ball member, and retaining means adapted to press said tongues against said ball member and seat said ball member firmly in the unslit part of said lining, said socket also including a fixed annular surface disposed around the ends of said extensions to limit the outward movement of said tongues and wherein said annular surface is provided on an annular insert disposed in said socket said lining further having a peripheral flange on said unslit part extending in the plane of the center line of said ball member outwardly beyond said tongues, said flange being located between an inner annular shoulder of said socket and said annular insert.

References Cited by the Examiner
UNITED STATES PATENTS 2,589,820   3/52   Konehan.
2,999,708   9/61   Dudash.
3,089,718   5/63   Gottschald et al.

FOREIGN PATENTS 1,146,639   5/57   France.
1,244,082   9/60   France.
725,724     3/55   Great Britain.

OTHER REFERENCES 1,014,441, Ehrenreich (German application).

CARL W. TOMLIN, Primary Examiner.
WALTER A. SCHEEL, Examiner.